United States Patent
Owen et al.

[15] 3,651,395
[45] Mar. 21, 1972

[54] METHOD FOR EXPLORING THE SURFACE OF THE EARTH WITH ELECTROMAGNETIC ENERGY INCLUDING COMPARING RERADIATION CHARACTERISTICS OF GASES TO LOCATE ESCAPING HYDROCARBON GASES AT THE SURFACE EMITTED BY DEPOSITS OF PETROLEUM AND/OR NATURAL GAS AT DEPTH

[72] Inventors: Robert L. Owen, New York, N.Y.; Julian M. Busby, Muskogee, Okla.

[73] Assignee: Advanced Geophysics, Inc., New York, N.Y. by said Owen

[22] Filed: Sept. 12, 1969

[21] Appl. No.: 857,488

[52] U.S. Cl. ...................................................324/6
[51] Int. Cl. ........................................G01v 3/12
[58] Field of Search ...........................324/6, 58.5

[56] References Cited

UNITED STATES PATENTS

| | | | |
|---|---|---|---|
| 2,139,460 | 12/1938 | Potapenko | 324/6 X |
| 2,165,214 | 7/1939 | Blau et al. | 324/6 X |
| 3,351,936 | 11/1967 | Feder | 324/6 X |
| 3,392,384 | 7/1968 | Wesch | 324/6 X |

*Primary Examiner*—Gerard R. Strecker
*Attorney*—Mandeville and Schweitzer

[57] ABSTRACT

The present invention makes use of the discovery of the fact that producing or potentially producing oil and/or gas fields usually have associated therewith at the earth's surface, the presence of escaping or permeating gases which have risen from underground stratigraphic and structural traps from which oil and/or natural gases may be recovered through drilled wells. Detection of the permeating gases is accomplished by focusing a beam of microwave radiation of known predetermined parameters thereupon, from remote locations, and measuring the parameters of the returned "reflected" microwave signals i.e., signals which are re-radiated by the hydrocarbons at the surface. Comparison of the frequency shift, and other parameters of the returned signal with the parameters of the transmitted microwave signal and correlation of the modified parameters of the returned wave with predetermined "microwave re-radiation characteristics" (MRC) of known gases will enable an immediate qualitative identification of a detected gas to be made and will enable an approximation of the quantitative concentrations of the detected gas to be made. Furthermore, by employing conventional navigational and cartographic procedures in association with the gas detecting practices of the present invention, it is possible to use ground vehicles and aircraft to explore, to prospect for, and to map gas and/or oil producing fields.

6 Claims, 2 Drawing Figures

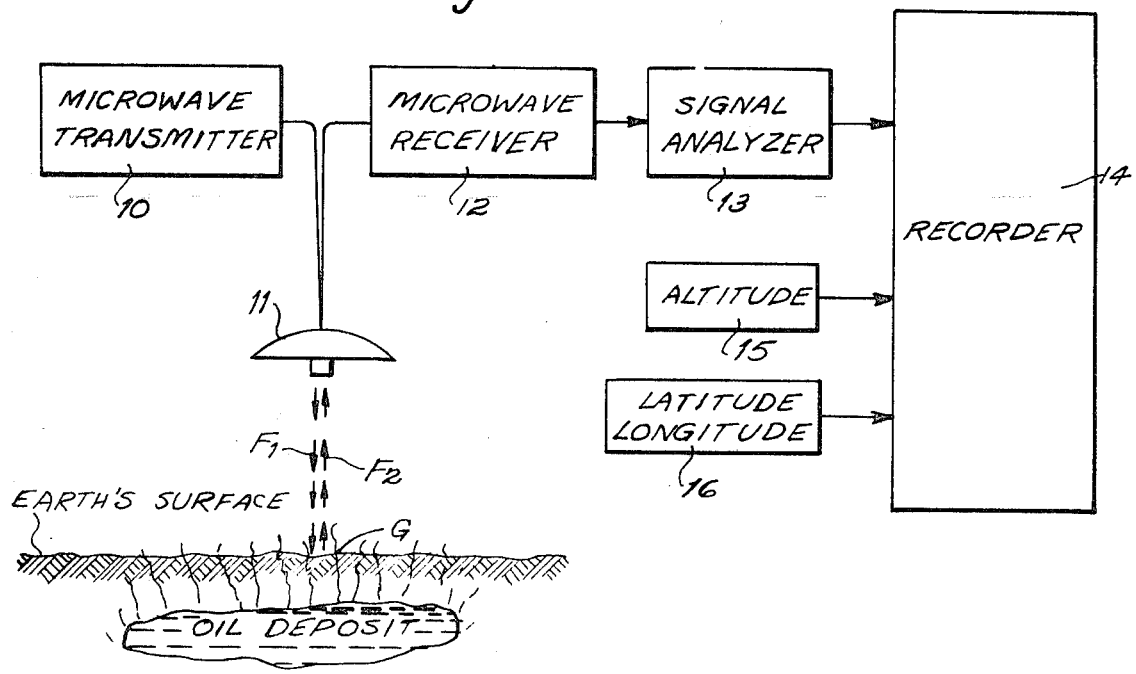
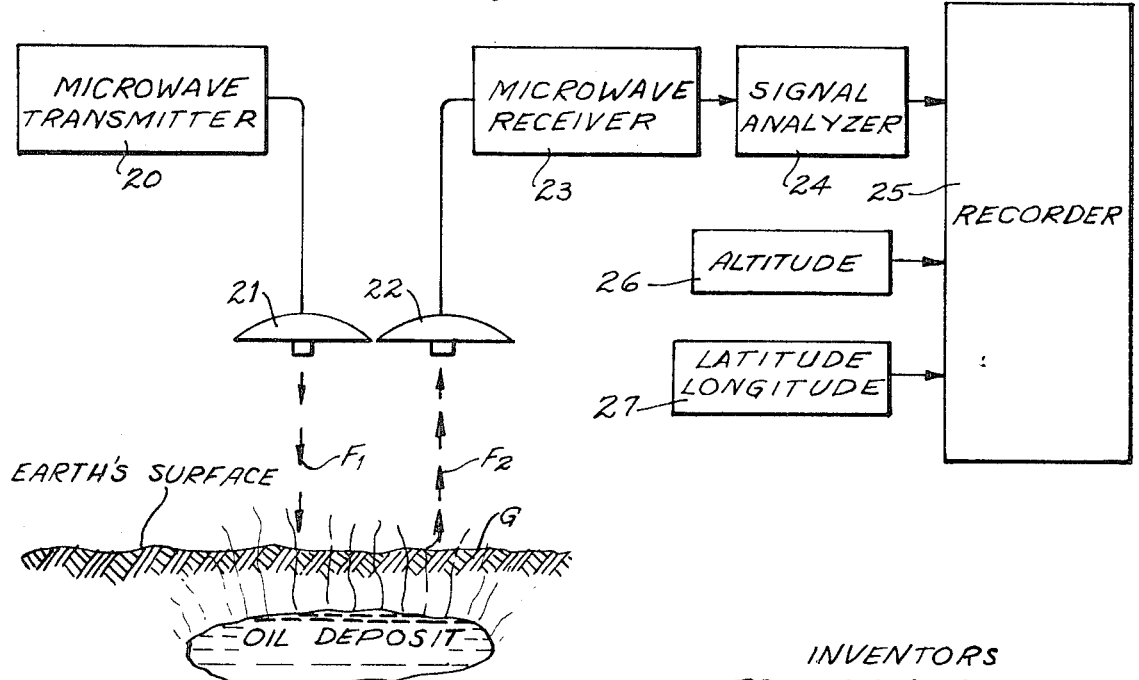

METHOD FOR EXPLORING THE SURFACE OF THE EARTH WITH ELECTROMAGNETIC ENERGY INCLUDING COMPARING RERADIATION CHARACTERISTICS OF GASES TO LOCATE ESCAPING HYDROCARBON GASES AT THE SURFACE EMITTED BY DEPOSITS OF PETROLEUM AND/OR NATURAL GAS AT DEPTH

BACKGROUND OF THE INVENTION

Heretofore, the oil and gas prospecting industry in its explorations has constantly sought structural underground traps, utilizing seismographic methods, since this has been the easiest and most feasible way to discover the presence of oil and/or gas deposits. In the past, the industry made very little effort to discover stratigraphic traps. The explanation for this is, of course, quite logical, since the task of locating a stratigraphic trap is quite formidable and until now, no workable, economically feasible, geological, geochemical or geophysical method of discovering a stratigraphic trap had been successfully utilized by the art. More importantly, structural traps heretofore have provided the industry with a relatively high success ratio. That is to say, a successfully drilled structural trap often contains more than one producing horizon. In other words, the penetration of a structural trap at a single location often turns up a plurality of reservoirs stacked one upon the other, whereas stratigraphic traps are rarely stacked in this fashion.

Since long established, well accepted geophysical methods have been comparatively successful in the discovery of structural traps and since such structural traps have been comparatively more fruitful in terms of production than stratigraphic traps, the efforts of the industry and the geophysicists working therein have been almost exclusively confined to the development and improvement of methods and apparatus for discovering the location of underground structural traps which methods and apparatus have been unsuccessful for discovering stratigraphic traps.

As a matter of fact, throughout the world, the major new oil discoveries continue to be predominantly in the form of structural traps of the anticlinal type. For example, the latest discoveries in offshore Australia, West Africa, Egypt, Russia, and Libya are all structural traps which were discovered by virtue of their structural features. Such structural features are conventionally and comparatively readily discoverable by the use of well-known well established seismic techniques. Thus, for example, the latest oil fields discovered in South America have been uncovered by the use of seismic technology as have the latest discovered gas and oil fields in the English channel offshore from Holland and from England. Likewise, offshore searches are currently being made in Brazilian and Venezuelian waters, as well as in the offshore gulf coastal waters and offshore California waters of the United States utilizing seismic exploration. The seismographical methods employed to discover the known structural traps have been used for many, many years starting in early 1920 to 1925 when the refraction seismograph was first introduced in America by German geophysicists. This geophysical aid has had a remarkable record of success in the discovery of new gas and oil fields, especially in hard access areas such as offshore areas and inland areas under cover where geologists had little or no outcrops or dryholes with which to ascertain structural features. However, seismographic exploration cannot be employed where the surface rocks are not receptive to this type of exploration.

In addition to the aforementioned seismic exploration or prospecting methods, magnetic and gravity methods have been long used for geological reconnaissance. As is well known in the geophysical arts, the magnetic techniques employ the measurement of the magnetic attraction of buried masses of igneous rocks or iron bearing near surface rocks that exceed a so-called normal level. Deviations in the pull of gravity of massive underground igneous bodies or lighter salt intrusions create anomalies from what would normally be expected in terms of gravity attraction of non-anomalous geological structures is an indication of the possible presence of an anticlinal or faulted feature.

In the past, geophysicists using the above outlined methods, have been able to select what appear to be favorable places to prospect for oil and gas. Likely looking areas were thoroughly surveyed by seismic methods to determine details of the structural traps, i.e., to define the depths and attitudes of the strata, the shapes of the submerged masses, etc. Of course, with these methods, the ultimate determination of the presence or absence of gas or oil is only made by actually drilling in the prospective area to determine the presence of gas or oil. The aforementioned geophysical methods of locating and defining the structural features of structural traps have been of little use in locating and defining stratigraphic traps and have been of limited or no use for subsurface structural determination when surface rocks are non-compatible to seismic investigation. Since it is accepted by many American geologists that almost all of the structural traps in the continental United States have been found, and that the location of as yet undiscovered structural traps is extremely difficult by known conventional methods, it is apparent that the search for oil and gas fields in the continental United States should now logically be concentrated on the search for other types of traps than structural traps, namely stratigraphic traps or that new methods and apparatus for discovering structural traps be developed. Furthermore, it is not unlikely that many stratigraphic and structural traps that have yet to be discovered actually exist in or around known American oil fields. Accordingly, it is to a new and improved method and apparatus for locating and defining stratigraphic and structural traps that the present invention is directed.

SUMMARY OF THE INVENTION

It has been discovered that underground traps very usually leak petroleum and/or natural gases up through the overlying rocks to the surface of the earth. These escaping gases have well definable and ascertainable "microwave re-radiation characteristics" (MRC) which may be used to enormous advantage in the prospecting for oil and gas by remote sensing. That is to say, that at a predetermined microwave wavelength, a gas will have unique and measurable radiation qualities. These qualities are employable in the practice of the invention to enable geophysicists to determine the presence of an escaping gas, the identity of the escaping gas, and the approximate concentration of the gas above the deposit from which the escaping gas emanates. While the practice of the invention may be carried out with radiated microwave energy, which as will be readily understood, may be beamed at or along the earth's surface from highly remote locations such as from mountain tops, moving or stationary ground vehicles, aircraft, and the like, it should be understood that higher frequency, shorter wavelength energy in the light portions of the spectrum may be employed for the same purposes once the "wave reflection characteristics" for the particular type and level of energy of the transmitted beam have been ascertained by geophysicists.

Remote and geophysical prospecting for unknown stratigraphic and structural traps is carried out in accordance with the principles of the invention, as follows. A transmitted beam of microwave energy (or shorter wavelength, higher frequency energy if desired) is beamed from a distance and focused upon the area under investigation. By the use of proper circuitry, re-radiation by the atomic structure of hydrocarbon gases caused by the incident beam of radiation from the transmitter (not from "hard" targets) may be appropriately detected by a microwave receiver tuned to the frequency or frequency band of the MRC response sought. That is to say, if a single species of gas is being sought, the apparatus being used to discover the presence of that gas will be highly tuned to detect only its presence through its peculiar "microwave re-radiation characteristics" and not the presence of other gases or other "hard" targets. Alternatively, if the prospecting in or the exploring of an area is being done to find the presence of any of several different species of escaping gases, the apparatus employed will include a transmitter capable of transmitting beams of microwave energy of known, predetermined parameters on a plurality of wavelengths throughout the microwave spectrum or throughout a predetermined limited band within the microwave spectrum and it will include a receiving apparatus which is adapted to receive the re-radiation of gases in their respective bandwidths. As will be understood, the re-radiated beam received will possess different parameters (frequency, power, etc.) from those of the transmitted beam, the difference in the frequencies being a function of the MRC of the detected gas and being a useful determinant of the specific identity of the detected gas. In addition to qualitatively identifying the species of the gas escaping at the surface from an underground stratigraphic trap, the method of the invention, utilizing the specific parameters, i.e., frequency shift, power, wave shape, etc. of the returned reflected microwave signal, will provide a quantitative indication of the concentrations of the escaping gas at the surface from the stratigraphic or structural trap, itself.

By utilizing the method of the present invention in conjunction with well-known cartographic surveying procedures, it will be readily possible to easily map surveyed areas geographically, for the presence of areas in which escaping gases indicative of underground traps exist. Using this information, it will, of course, be a simple matter to develop maps and drill wells in those areas where escaping gases have been located to exploit the presence of a field. Unlike the previous seismic and other conventional methods employed to discover structural traps, which methods, in effect, mapped detected possible subsurface geological structural features, which features geophysicists by induction determined were likely to contain oil, the present method determines absolutely the underground presence of a source of hydrocarbon gases originating from a deposit of gas and/or oil.

DESCRIPTION OF THE DRAWINGS

FIG. 1 is a schematic block diagram of apparatus of the invention used for the practice of the new method for prospecting for underground stratigraphic and structural traps; and FIG. 2 is a schematic block diagram of an alternate embodiment of the invention.

DETAILED DESCRIPTION OF THE INVENTION

Apparatus of the preferred embodiment of the invention includes a microwave transmitter 10 which may be of readily, commercially available construction and a microwave receiver 12 which also may be of readily, commercially available construction. Thus, the transmitter can be chosen and operated to transmit continuously or to transmit in bursts or pulses of microwave energy. In the embodiment illustrated in FIG. 1, the transmitter 10 and receiver 12 share a common parabolic antenna 11, which transmits a highly concentrated beam of microwave energy, having known predetermined parameters, generated by the transmitter 10.

The high frequency, microwavelength energy is directed towards the earth's surface at a predetermined microwave frequency $F_1$. The beamed microwave energy strikes escaping gases G, if present, at the earth's surface. When a gas is present, the incident microwave energy will be modified in accordance with its "microwave re-radiation characteristics" and "reflected," i.e., re-radiated, back to the antenna 11. The "reflected" waves will possess modified parameters, (including a shifted frequency $F_2$) in comparison to those of the incident waves. As will be understood and in accordance with the invention, the precise differences in the parameters will be a function of the quality and quantity, specific gas, its "microwave re-radiation characteristics" (MRC) which may be empirically determined and tabulated in advance.

The received signal is conducted from the antenna 11 to a receiver 12 where its precise parameters are detected. As a most important aspect of the invention, these detected parameters including the degree of frequency shift from the transmitted frequency $F_1$ to the reflected frequency $F_2$ are employed in the analysis of the detected gas G. The degree of frequency shift as well as the degree of attenuation of the transmitted wave as "reflected" from the gas G, functions of the MRC, will be indicative, in accordance with the principles of the invention, of both the identity of the escaping gas G and of an approximation of the quantity of the presence thereof. As will be appreciated, the returned, "reflected" signal may be amplified through suitable apparatus and its parameters ascertained through signal analyzing and measuring equipment such as a power meter 13 and recorded on a suitable multichannel recorder 14. Alternatively or additionally, the "reflected" signal may be displayed on an oscilloscope or other graphic display device.

In accordance with the principles of the invention, the prospecting apparatus disclosed in FIG. 1 may be mounted in an aircraft for exploring vast areas in short order. Alternatively, the apparatus may be mounted in a fixed station at a vantage point which overlooks large areas such as a mountain peak or in an elevated location such as a tower. Of course, when deemed necessary or desirable, the apparatus of the invention may be mounted in a truck or other motor vehicle for surveying prospective oil and/or gas producing fields by actually driving over the terrain thereof.

When the apparatus is employed in conjunction with an aircraft for aerial surveying and prospecting, suitable recording of the altitude, latitude and longitude of the aircraft may be made contemporaneously with the recording of the data generated by the transmitter and receiver. Apparatus for detecting and recording the altitude, latitude and longitude coordinates of the surveying vehicle (aircraft or motor vehicle) is indicated schematically in FIG. 1 at 15 and 16. In this manner, detected gases may be located by geographic coordinates and elevations which will, of course, enable hypsometric maps of discovered fields to be drawn with facility and accuracy.

In FIG. 2, an alternate embodiment of the invention is depicted. The system of FIG. 2 includes a pair of antennas 21, 22 mounted side-by-side in a bi-static arrangement to form a line at right angles to the principle flight path axis or vehicle path axis of the aircraft or vehicle in which the apparatus is mounted. Each of the antennas 21, 22 is a readily available parabolic antenna of the type used in connection with microwave transmission and reception. A microwave transmitter 20 is associated with the antenna 21 for the generation and radiation of a beam of microwaves downwardly towards the area being surveyed.

As will be understood, the antenna 22 is focused to receive re-radiated beams of radiation from escaping gases. Such "reflected" signals are conducted from the antenna 22 to a microwave receiver 23 where the signal is amplified before it is transmitted to the power meter 24 or other parameter analyzing and measuring equipment, where the various parameters of detected, "reflected" microwave $F_2$ are measured. The measured parameters may be recorded on a moving tape or other suitable medium in a conventional multichannel recording apparatus indicated schematically at 25.

In accordance with the principles of the invention, the apparatus is arranged and operated to detect only beams of microwave energy re-radiated from escaping gases; all "hard targets" are not detected by the apparatus. Accordingly, when no gases are present beneath the antenna 21 and in the paths of the beamed energy at frequency $F_1$ emanating therefrom, no reflection will be detected by the receiver 23, which will be sharply tuned for the detection only of microwave energy from escaping gases having a predetermined MRC or range of MRC. The "reflected," i.e., re-radiated, return signals may be displayed immediately upon an oscilloscope, such as a plan position indicator, for obtaining an immediate "readout" of the signals detected by the apparatus of the invention contemporaneously with the recording thereof by recorder 25. Moreover, permanent records of the traces of the oscilloscope may be obtained by photographic techniques, which also could be used simultaneously to record the readings of altitude, latitude and longitude indicators 26, 27. Where this type of photographic recording of data is employed, a suitable prismatic arrangement may be developed in order to simultaneously aerially photograph the terrain at which the presence of a gas has been detected.

By way of a concrete example, the method of the present invention has been practiced by irradiating terrain under exploration from a "surveying station" located approximately 2,000 feet away. The "surveying station" was at ground level relative to the terrain under exploration. The equipment at the "surveying station" included a transmitter, transmitting antenna, receiver, receiver antenna, and associated apparatus such as plan-position indicator and power sources.

The transmitter broadcast a signal $F_1$ having the following parameters: 9,375 megacycle frequency; being a wavelength of 1.2570624 inches or 3.1929448 centimeters; power of 10 kw. The receiver detected "reflected," i.e., re-radiated, signals $F_2$ from escaped natural gas, which signal had the following parameters: A frequency of 9361 megacycles or a wavelength of 1.2589424 inches or 3.1977291 centimeters.

The differences between $F_1$ and $F_2$ were due to the MRC of the detected gases at the broadcast parameters. No signals from "hard targets" were detected by the receiver because the receiving apparatus was tuned to 9,361 mc. and could not receive any re-radiated electromagnetic waves on the broadcast frequency of 9,375.

A test bore drilled at a site in which escaping gases indicated the presence of underground deposits of gas and/or oil verified the existence of such deposits at a depth of 870 feet.

It will be appreciated that suitable circuitry or available equipment can be employed to completely automate the exploration process of the invention. That is to say, the detection and recording apparatus may be precalibrated to select and record (and/or display) only returned reflected signals indicating an oil or gas deposit having predetermined minimum properties in terms of potential production. In other words, the apparatus will have "built-in" to it by the inclusion of appropriate circuitry or components, facilities for comparing or ascertaining the differences between the incident and reflected microwave energy and correlating the same, based on known MRC values, to determine the location of large oil and/or gas fields. Thus apparatus having gross "go-no go" (oil-no oil) detection capabilities, can be produced for use by relatively unskilled personnel.

While the foregoing disclosure has been directed to new methods and apparatus for gas and oil exploration; it should be understood that similar techniques and equipment may be used in prospecting for other underground mineral deposits. That is to say, many mineral deposits are constantly subject to chemical reactions, namely oxidation, which tend to liberate gases which escape to the earth's surface by permeating through the overlying soil and rocks. Utilizing the MRC of the gases escaping from underground mineral deposits, an evaluation of the quality and quantity of the deposit may be made.

A further use for the method and apparatus of the present invention is in the prevention of drilling "dry holes" in areas previously prospected by conventional methods. Thus where a seismic exploration, for example, would suggest the presence of an oil or gas field, it is a simple matter to verify the presence or absence of gas or oil by the practice of the present invention, rather than by the costly and time consuming, actual drilling of a test bore. Thus, the apparatus of the invention may be immediately employed in the "go-no go" (oil-no oil) sense to supplement conventional exploration techniques.

A still further more limited application of the techniques of the invention is for the aerial surveillance of gas pipe lines. While the presence of leaks somewhere within the line can be detected by a measured pressure drop, the actual locating of the point or points of leakage is a difficult undertaking. As will be readily appreciated, rather than inspecting a pipe line slowly and visually, a quick and efficient inspection of an entire pipe line may be made from an aircraft equipped with appropriate microwave transmitting and receiving apparatus suitably tuned in accordance with MRC of the piped gas.

It is to be understood, of course, that the method and apparatus herein illustrated and described are intended to be representative only, as certain changes may be made therein without departing from the clear teachings of the disclosure. Accordingly, reference should be made to the following appended claims in determining the full scope of the invention.

We claim:

1. A method of locating underground gas, oil, or mineral deposits comprising the steps of
   a. generating a beam of incident microwave energy having predetermined parameters including a first frequency;
   b. focusing and radiating said beam of incident microwave energy having predetermined parameters upon the escaping gases at the surface of terrain under exploration and thereby causing said gases to re-radiate said energy at second and different frequencies;
   c. detecting microwave energy from re-radiated at said different frequencies gases at the surface of the terrain under exploration;
   d. measuring certain parameters of said detected microwave energy including at least the re-radiated frequencies thereof; and
   e. correlating the parameters of said incident and re-radiation microwave energy including the frequency differentials between the incident and re-radiated energies, with predetermined microwave re-radiation characteristics of selected gases.

2. The method of claim 1, in which
   a. said radiated microwave energy is generated remotely of and at elevated altitudes with respect to the terrain under exploration;
   b. said reflected microwave energy is detected remotely of and at elevated altitudes with respect to the escaping gases at the surface of the terrain under exploration.

3. The method of claim 1, in which
   a. said microwave energy is continuously transmitted.

4. The method of claim 1, in which
   a. said microwave energy is intermittently transmitted.

5. The method of claim 1, in which
   a. a single species of gas is sought;
   b. said microwave energy is transmitted and detected over narrow bandwidths determined at least in part by the microwave re-radiation characteristics of said single species of gas.

6. The method of claim 1, in which
   a. any one of several species of gases is sought;
   b. said microwave energy is transmitted and detected over bandwidths determined at least in part by the spectrum of microwave re-radiation characteristics of the several species of gases.

* * * * *

PO-1050
(5/69)

UNITED STATES PATENT OFFICE
CERTIFICATE OF CORRECTION

Patent No. 3,651,395          Dated March 21, 1972

Inventor(s) Robert L. Owen and Julian M. Busby

It is certified that error appears in the above-identified patent and that said Letters Patent are hereby corrected as shown below:

Column 6, lines 31 and 32    "c. detecting microwave energy from re-radiated at said different frequencies gases at the surface of the terrain"  should read --c. detecting microwave energy re-radiated at said different frequencies from gases at the surface of the terrain--.

Signed and sealed this 23rd day of January 1973.

(SEAL)
Attest:

EDWARD M.FLETCHER,JR.
Attesting Officer

ROBERT GOTTSCHALK
Commissioner of Patents